US012510130B2

(12) United States Patent
Cerniway

(10) Patent No.: US 12,510,130 B2
(45) Date of Patent: Dec. 30, 2025

(54) SHOCK AND THERMAL PROTECTION FOR SMART MUNITIONS

(71) Applicant: BAE SYSTEMS Information and Electronic Systems Integration Inc., Nashua, NH (US)

(72) Inventor: Matthew A. Cerniway, Madison, AL (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 507 days.

(21) Appl. No.: 18/055,693

(22) Filed: Nov. 15, 2022

(65) Prior Publication Data

US 2024/0159293 A1    May 16, 2024

(51) Int. Cl.
*F16F 15/04* (2006.01)
*F16F 9/30* (2006.01)
*F42B 12/20* (2006.01)

(52) U.S. Cl.
CPC .............. *F16F 15/04* (2013.01); *F16F 9/30* (2013.01); *F42B 12/207* (2013.01)

(58) Field of Classification Search
CPC .................................................... F42B 12/207
See application file for complete search history.

(56) References Cited

U.S. PATENT DOCUMENTS

| 6,386,134 | B1* | 5/2002 | Monson | B63B 17/0081 |
| | | | | 114/343 |
| 6,578,682 | B2* | 6/2003 | Braman | F16F 15/08 |
| | | | | 267/140.13 |
| 7,883,071 | B2 | 2/2011 | Fox et al. | |
| 8,931,765 | B2 | 1/2015 | Braman et al. | |
| 9,069,001 | B2* | 6/2015 | Braman | G01C 21/166 |
| 10,386,166 | B2 | 8/2019 | Thomas | |
| 2019/0232125 | A1* | 8/2019 | Parsons | A63B 53/047 |

FOREIGN PATENT DOCUMENTS

| CN | 102397687 A | * | 4/2012 | ............ A63B 59/50 |
| CN | 109582101 A | * | 4/2019 | ............ G06F 1/182 |
| CN | 208885600 U | * | 5/2019 | |
| GB | 2284246 A | * | 5/1995 | ............ F16F 1/3605 |
| TW | 201316138 A | * | 4/2013 | ............ B82Y 10/00 |
| WO | WO-2008148203 A1 | * | 12/2008 | ............ B32B 25/10 |

OTHER PUBLICATIONS

Schaefer, Ronald J., "Chapter 33 Mechanical Properties of Rubber" (2001).
Chen, Zhou, "Effective Mitigation of Shock Loads of Embedded Electronics in Smart Ammunitions by Polymeric Encapsulation", Department of Mechanical and industrial Engineering, University of Toronto (2014).

* cited by examiner

*Primary Examiner* — Melody M Burch
(74) *Attorney, Agent, or Firm* — Gary McFaline

(57) ABSTRACT

An isolation assembly for use with a munition includes a housing extending along a central axis and defining a cavity. A shuttle is at least partially within the cavity with an air gap between the shuttle and the housing, where the shuttle is configured to contain one or more electronic components. An isolation assembly in the gap between the shuttle and the housing includes an elastomeric isolator and one or more seals. The isolation assembly retains the shuttle in the cavity with six degrees of freedom.

19 Claims, 8 Drawing Sheets

SHOCK AND THERMAL PROTECTION FOR SMART MUNITIONS

TECHNICAL FIELD

The present disclosure relates to structures for mitigating shock and thermal transfer to electronic devices, and more particularly to an isolation assembly for electronic components in gun-launched munitions.

BACKGROUND

Precision-guided munitions (also known as PGM or smart munition) are guided to hit a specific target. Smart munitions have increased accuracy and reduced collateral damage, owing to guidance to a specific target that is aided by millimeter-wave radar, satellite control, laser guidance, and global positioning system (GPS) guidance technologies, to name a few examples. One example of a smart munition is a 155-mm artillery shell that employs GPS guidance technology. Another example is a guided 127-mm shell for use with naval guns.

Gun-launched smart munitions experience both long duration (e.g., >10 milliseconds) multi-axis acceleration and extreme operating temperatures (e.g., >1000° F.). Thus, the advent of smart munitions and projectiles with integrated electronic systems involves integrated circuit (IC) technologies placed in the center of a hostile, launch-induced environment.

SUMMARY

One aspect of the present disclosure is directed to an isolation assembly configured to mitigate shock and thermal transfer to electronics in a munition. Another aspect of the present disclosure is directed to an electronics assembly for a gun-launched munition. A further aspect of the present disclosure is directed to a munition comprising one or more circuit boards or other electronic devices retained in a nose portion of the munition, and an isolation assembly configured to attenuate shock forces and thermal transfer to the electronics as a result of a gun launch.

The features and advantages described herein are not all-inclusive and, in particular, many additional features and advantages will be apparent in light of the drawings, specification, and claims. Moreover, it should be noted that the language used in the specification has been selected principally for readability and instructional purposes and not to limit the scope of the disclosed subject matter.

Figure 1:
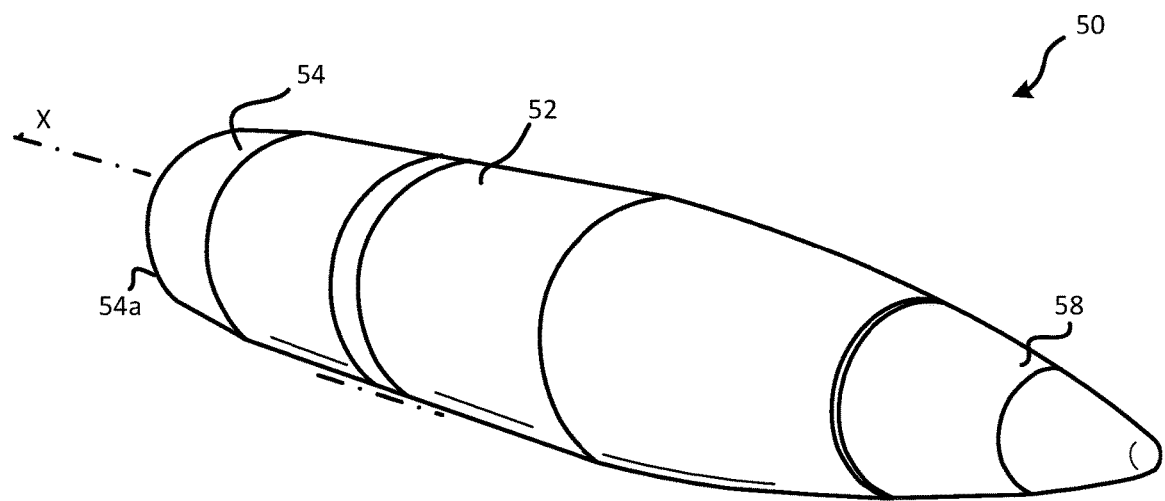
FIG. 1 is a front perspective view of a guided munition, in accordance with an embodiment of the present disclosure.

The figures depict various embodiments of the present disclosure for purposes of illustration only. Numerous variations, configurations, and other embodiments will be apparent from the following detailed discussion.

DETAILED DESCRIPTION

Disclosed are techniques for protecting electronics of munitions from shock and thermal stress. Although the techniques can be used in any number of munitions, they are particularly useful in munitions subjected to gun-launched environments. One example embodiment is an electronics assembly for a munition. The assembly includes a housing extending along a central axis and defining a cavity. A shuttle is received in the cavity with a gap between the shuttle and the housing, where the shuttle contains one or more electronic components, such as circuit boards of sensor electronics. The isolation assembly has one or more elastomeric isolators extending around the shuttle between the shuttle and the housing such that the shuttle is isolated from the housing and movably retained by the elastomeric isolator(s) in the housing with six degrees of freedom. Seals, such as anti-extrusion rings, are arranged to prevent extrusion of the elastomeric isolator(s) into the gap under high compression conditions. For example, upon launch, the elastomeric isolator(s) may be compressed to bulk modulus conditions with a non-linear spring rate. In such conditions, the isolator(s) may be converted to a liquid. The isolation assembly can be installed into a munition, such as a munition configured for firing or launch from a launch tube, tank, naval gun, a Howitzer, or other barreled gun. For example, the housing is rigidly mounted in the nose portion of the munition. Upon firing, the isolation assembly attenuates shock forces and thermal transfer to the electronic components.

Overview

Gun-launched and tube-launched munitions may include electronics to guide the munition to a specific target, such as using radar and/or laser guidance. These munitions are subject to high temperatures during low altitude, supersonic flight (sub-Mach 5), temperatures which can quickly exceed 1000° F. after launch and remain high for a relatively long period of time (e.g., 10s to 100s of seconds). The impulse of the launch also subjects the munition and its electronic components to extreme acceleration (e.g., about 20,000 Gs for a period of about 20 milliseconds, as measured using a half sine wave technique). In order to survive launch and to remain useful during flight to guide the munition to the target, the electronics assembly should be configured to withstand this long-duration impulse and to withstand elevated temperatures in flight.

Conventional gun hardening methods focus on increasing the stiffness of the circuit board substrate as well as epoxy encapsulation techniques in integrated circuits. In a tube-launched application, increased stiffness typically results in increased system mass, an undesirable trait that is amplified by high acceleration. The resulting design may exceed desired packaging and/or center of gravity requirements of the munition. Another challenge is the limited space available for electronics. When this valuable space is consumed with integrated circuit packaging, little space remains for thermal protection. As a result, a circuit may survive launch only to fail within the first few seconds of flight due to high heat. Also, full shock isolation requires that the resonant frequency of the electronic enclosure be below the frequency of excitation. Unfortunately, this condition is difficult or impossible to meet in many gun-launched or tube-launched applications because the given form factor necessitates a dimension that is orders of magnitude greater than what is available. To this end, the shock and thermal protection to electronics is associated with several non-trivial issues.

Thus, techniques are provided herein for gun hardening electronics in munitions. In accordance with some embodiments of the present disclosure, an electronics assembly includes a shuttle containing one or more printed circuit boards (PCBs). The assembly's outer shell or housing transfers shock through a viscoelastic polymer, which in conjunction with the anti-extrusion rings act as a spring-damper suspension system. Depending on the configuration and length of shuttle stroke, the spring rate is defined by either elastic (E) or bulk (K) modulus material properties. The elastic modulus is several orders of magnitude below the bulk modulus. The resonant modes of the shuttle are designed to be lower, by at least an order of magnitude, than those of the PCBs.

In one embodiment, elastomeric isolators retain the shuttle in a free-floating condition with respect to the housing. For example, the elastomeric isolators act as a soft spring and provide the shuttle with up to six degrees of freedom with respect to the housing. Upon launch, the elastomeric isolators are compressed from the elastic modulus condition to a bulk modulus condition where the material becomes a liquid. The elastomeric isolators absorb medium to high frequency energy before it can be transmitted to the integrated circuits and excite its high frequency bending mode, which is the primary mechanism for integrated circuit failure. During set-back, the yield stress limits are exceeded, and the acceleration energy is converted into heat. The elastomer is contained by anti-extrusion rings, thus affording a bulk modulus condition which produces a non-linear spring rate. Operating under bulk modulus conditions allows for a high-G, multi-axis, and heat tolerant suspension system in a confined space.

In some such example embodiments, the amplitude of the shock transmitted from the munition to the PCBs via the shuttle is reduced at least by a factor of 3 (e.g., from 20,000 Gs to about 6670 Gs), including at least by a factor of 5, or at least by a factor of 10. In one such embodiment, gun-launched shock amplitude is reduced from about 20,000 Gs to about 2000 Gs. Stated differently, the suspension system results in at least 3 times, at least 5 times, or at least 10 times reduction in PCB shock input. Numerous variations and embodiments will be apparent in light of the present disclosure.

Example Embodiments

Figure 2:
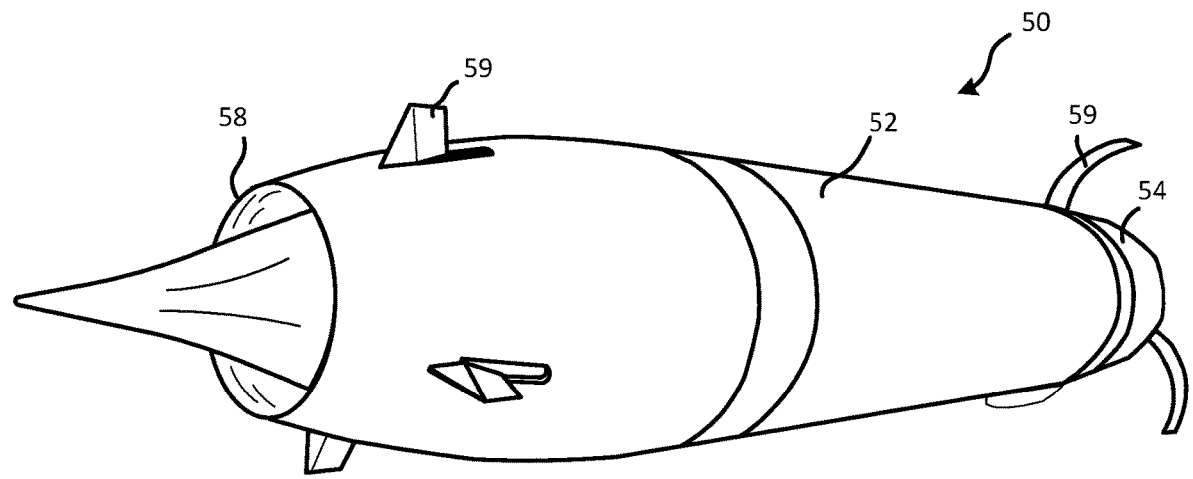
FIG. 2 is a front perspective of a ramjet artillery round, in accordance with an embodiment of the present disclosure.

FIG. 1 illustrates a gun-launchable smart munition 50 configured as a 155-mm Howitzer shell extending along a central longitudinal axis or X-axis, in accordance with an embodiment of the present disclosure. FIG. 2 illustrates a front perspective view of a munition 50 configured as a 155 mm ramjet artillery round. The munition 50 can have other diameters and be configured for firing from a tank, anti-aircraft gun, mortar tube, or any barreled artillery gun. For example, the munition 50 has a diameter from 20 mm to 180 mm, including 60 mm, 80 mm, 100 mm, 127 mm, and 155 mm to name a few examples. Principles of the present disclosure can be readily applied to munitions outside of this size range.

In these examples, the munition 50 has a body 52 with a circular cross-sectional shape between a tail 54 and a nose portion 58. The nose portion 58 can house guidance systems or other electronics, such as a laser seeker. The tail 54 can have a cylindrical geometry, a tapered or "boat tail" geometry, or other geometry. In some embodiments, the tail 54 includes an explosive charge and primer charge for launching the munition 50. The nose portion 58 is removable or otherwise can be installed on the munition 50 after installation of electronics, such as by threaded engagement, snap fit, fasteners, or other suitable means. In some examples, such as shown in FIG. 2, the munition 50 includes deployable fins 59 to stabilize flight after launch. The munition 50 is gun launchable in that it can be fired from a barrel using an explosive charge.

Figure 3:
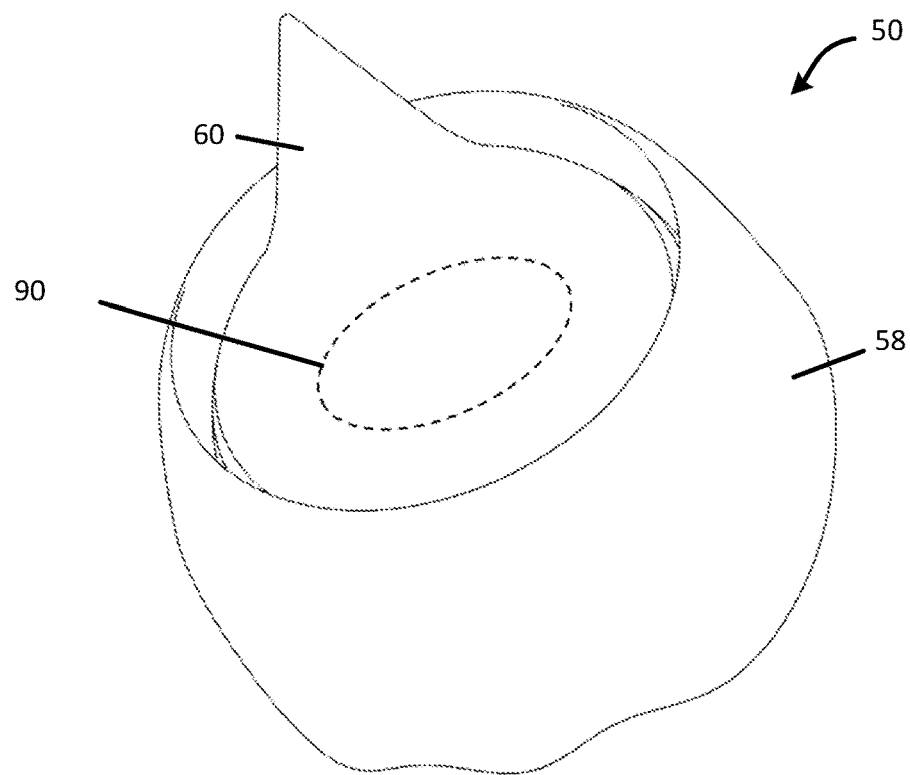
FIG. 3 is a perspective view of a nose portion of a munition and shows a radome and volume for an electronics assembly, in accordance with an embodiment of the present disclosure.
Figure 4:
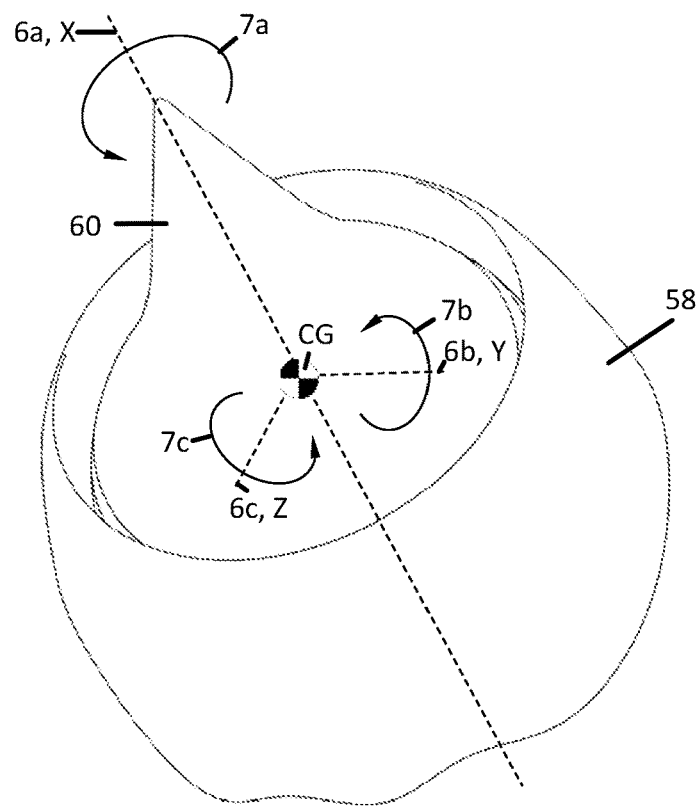
FIG. 4 is a perspective view of a nose portion of a munition and illustrates axial forces and moments associated with launch forces, in accordance with an embodiment of the present disclosure.

FIGS. 3 and 4 illustrate perspective views of a nose portion 58 of a munition 50, in accordance with an embodiment of the present disclosure. The nose portion 58 includes a mounted electronics assembly 90 and a radome 60 transparent to radio frequencies (RF-transparent). The radome 60 has an internal volume of sufficient size to house the electronics assembly 90, such as circuit boards 140 (shown, e.g., in FIG. 5) of a sensor.

As illustrated in FIG. 4, thermal gradients and mechanical forces are generated in the munition 50 due to gun launch and flight. Gun-launched munitions experience accelerations in excess of 20,000 Gs in addition to thermal and pressure loading due to aerodynamic loading during supersonic, maneuvered flight. The dynamics can be decomposed into vectors 6a, 6b, 6c along X, Y, and Z axes, and about moments 7a, 7b, 7c, respectively, with respect to a center of gravity CG of the sensor assembly 90.

Figure 5:
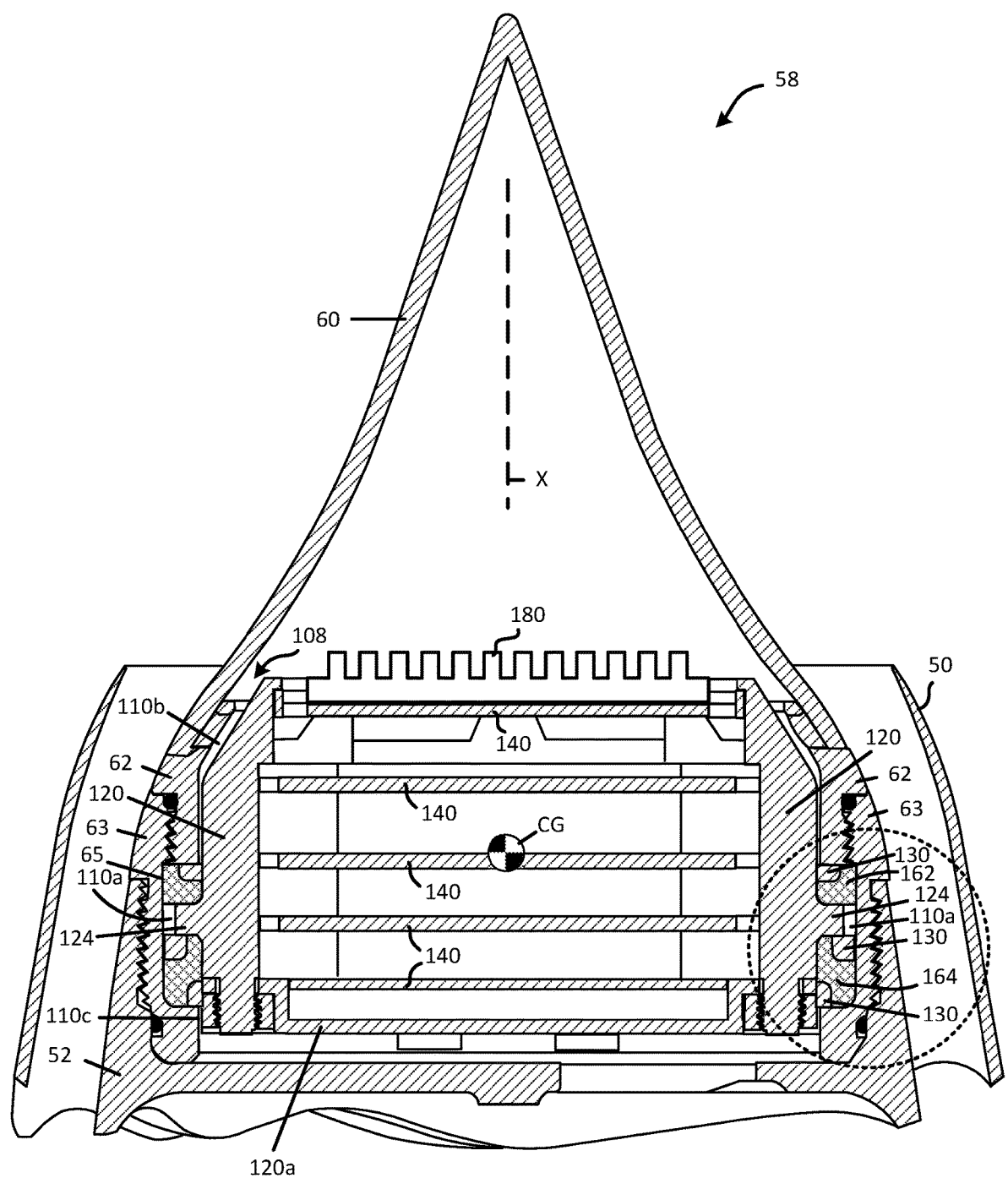
FIG. 5 is a cross-sectional view of a nose portion of a munition, in accordance with an embodiment of the present disclosure.
Figure 6:
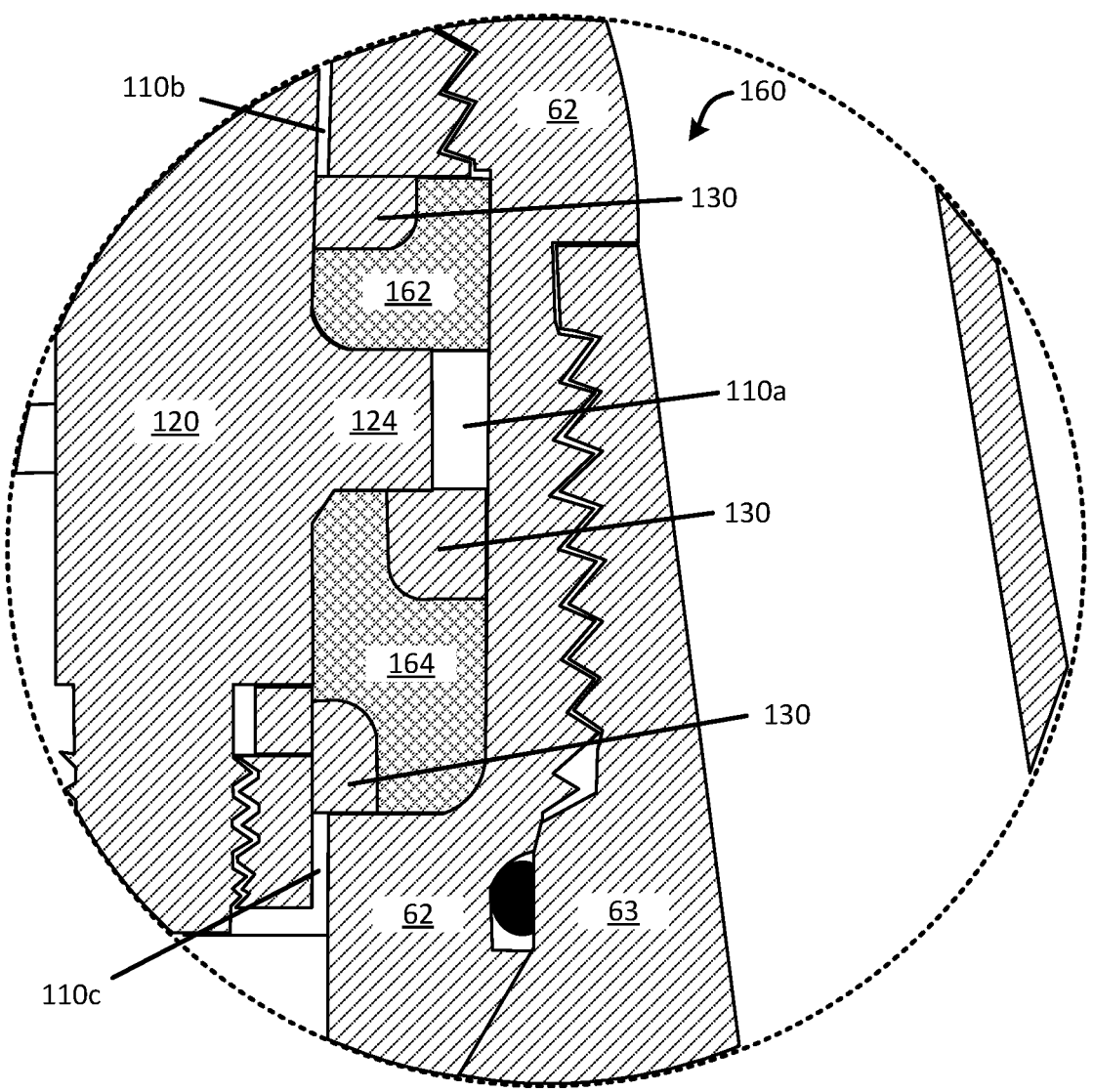
FIG. 6 illustrates a close-up view of the region within the dashed circle of FIG. 5.

FIG. 5 illustrates a cross-sectional view of nose portion 58 of a munition 50 that includes an isolation assembly 160 for an electronics assembly 90, in accordance with an embodiment of the present disclosure. A close-up view of the isolation assembly 160 is provided in FIG. 6. The munition 50 includes a housing 52 that includes a radome adapter 62 and housing adapter 63, in combination which define a cavity 108. A shuttle 120 is retained in the cavity 108 by the isolation assembly 160, which includes a plurality of isolators 162, 164 of elastomeric material. Each isolator 162, 164 includes a low-density elastomer and has one or more seals 130 in the form of anti-extrusion rings. The elastomer can be selected based on its operational thermal limit and density. The density of the elastomer can be adjusted for a given shock load by adding microspheres up to 40% by volume. In some embodiments, each isolator 162, 164 provides both a high thermal impedance and a configurable, variable stiffness spring.

The electronics assembly 90 can include one or more circuit boards 140 and an RF array 180, such as for sensor electronics. Some or all components of the electronics assembly 90 are housed in the shuttle 120. The shuttle 120 is suspended by an upper or first isolator 162 and a lower or second isolator 164 of viscoelastic material. Each isolator 162, 164 is confined longitudinally, or in the X-axis direction, by the housing adaptor 63 and the radome adaptor 62, the latter providing isolator compression and system preload. The shuttle 120 includes a protrusion 124 that protrudes radially outward, such as a circumferential flange. The protrusion 124 is received in a channel 65 defined by the housing adapter 63 and radome adapter 62. The protrusion 124 is positioned axially between an upper or first isolator 162 and a lower or second isolator 164. In a radial direction, the protrusion 124 is separated from the housing adapter 63 by a first gap portion 110a of air gap 110 and from radome adapter 62 by second gap portion 110b of air gap 110. A lower portion of the shuttle 120 adjacent the end cap 120a is separated radially from the housing adapter 63 by third gap portion 110 of air gap 110. The isolation assembly 160 allows the shuttle 120 to translate in all six degrees of freedom.

In this example, the upper or first isolator 162 is retained by a single seal 130 along an upper margin of the first isolator 162. The seal 130, an anti-extrusion ring, forms a seal between the shuttle 120 and the housing 52. The first isolator 162 abuts the protrusion 124 and borders the air gap 110a between the protrusion 124 and radome adapter 62. The spring rate of the first isolator 162 is governed by Young's modulus and sheer modulus conditions since the isolator volume is not restricted. In this example, the isolation assembly 160 has a configuration where the elastomeric first isolator 162 is allowed for extrude into the radial air gap 110, providing viscous damping to slow and arrest the shuttle 120 during the rebound and upward stroke of the shuttle 120. The lower or second isolator 164 is positioned radially between the shuttle 120 and the housing adapter 63 and is positioned axially adjacent a bottom end cap 120a of the shuttle 120. Seals 130 in the form of anti-extrusion rings are above and below portions of the second isolator 164 to prevent extrusion of the second isolator 164 into the first gap portion 110a, above, and to prevent extrusion into the third gap portion 110c between the shuttle 120 and housing 52, below. The second isolator 164 operates as a compressive spring under Young's modulus and bulk modulus conditions.

Figure 7:
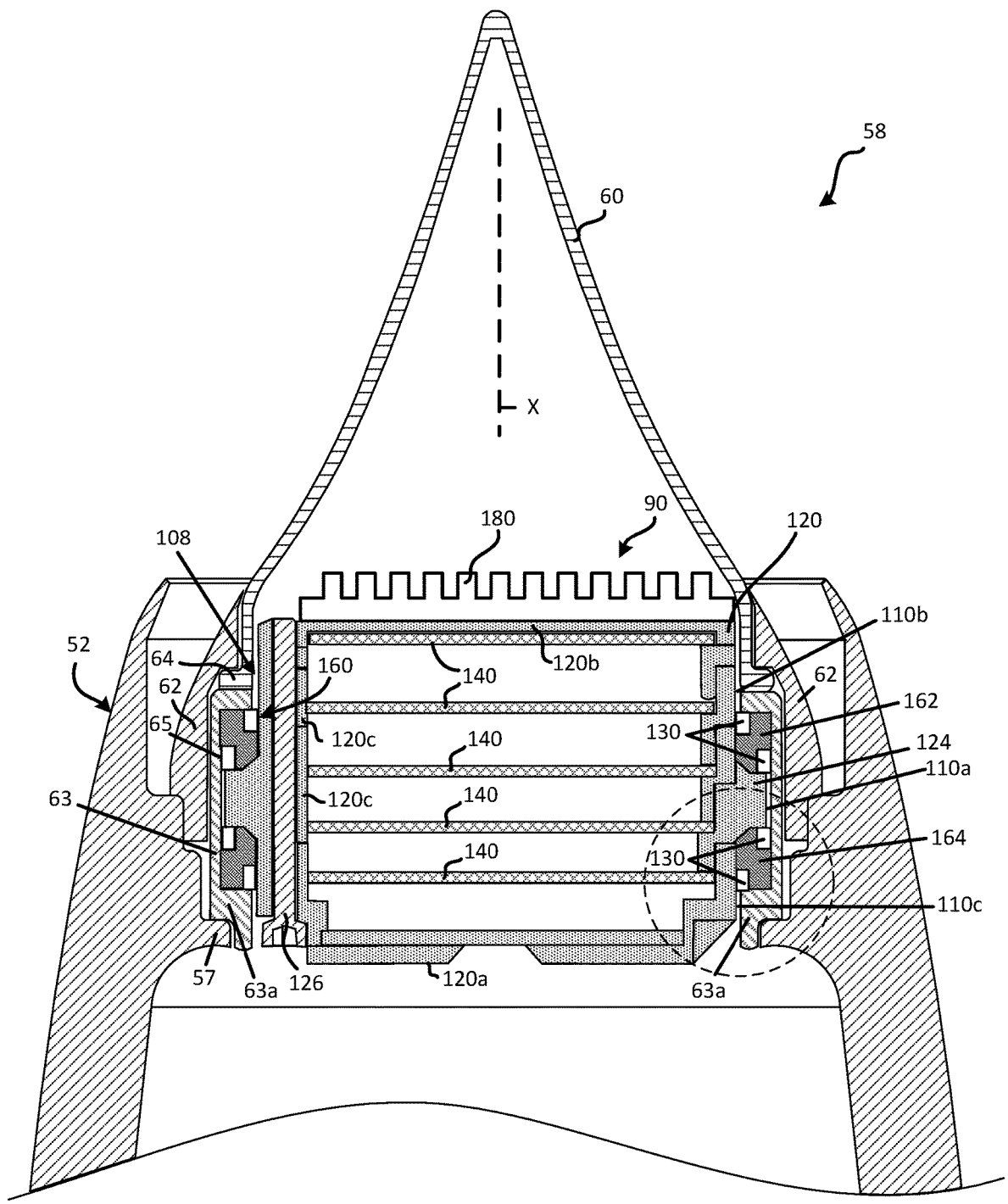
FIG. 7 is a cross-sectional view of a nose portion of a munition, in accordance with another embodiment of the present disclosure.

FIG. 7 illustrates a cross-sectional view showing a nose portion 58 of a munition 50 that includes an isolation assembly 160 for an electronics assembly 90, in accordance with another embodiment of the present disclosure. A close-up view of the isolation assembly 160 is provided in FIG. 8. The isolation assembly 160 is configured to attenuate shock transmission and thermal transmission to the circuit board(s) 140 and other components of the electronics assembly 90, in accordance with some embodiments.

The munition 50 has a housing 52 that includes a radome adapter 62 and a housing adapter 63. The housing 52, which includes the radome adapter 62 and housing adapter 63, defines a cavity 108 sized to receive the shuttle 120 that houses or retains one or more circuit boards 140 and/or other electronic components of the electronics assembly 90, such as an RF array 180. In this example, the housing 52 and shuttle 120 have a generally cylindrical shape; however, other geometries are acceptable, including a square, oval, hexagonal, or other cross-sectional shape. The isolation assembly 160 is positioned radially between the housing 52 and the shuttle 120 and suspends the shuttle 120 with six degrees of freedom, namely, that the shuttle 120 can translate along each of the X, Y, and Z axes as well rotate about each of the X, Y, and Z axes (shown in FIG. 4). The amount of translation and/or rotation is limited at least in part by compression of the elastomeric isolator(s) 162, 164.

In more detail, the housing adapter 63 generally has a rectangular C-shape that defines a channel 65. The shuttle 120 includes a protrusion 124 that extends radially outward and is received in the channel 65. The isolation assembly 160 is also received in the channel 65. In this way, the housing 52 and shuttle 120 have a radially overlapping structure. An air gap 110 between the shuttle 120 and the housing 52 is bridged by seals 130. The isolation assembly 160 includes an upper or first isolator 162, a lower or second isolator 164. The first isolator 162 is on a first side (e.g., upper side) of the protrusion 124 and the second isolator 164 is on a second side (e.g., lower side) of the protrusion 124. Each isolator 162, 164 includes upper and lower seals 130 configured as anti-extrusion rings. The seals 130 can move axially with the shuttle 120 and are configured to prevent extrusion of the elastomeric isolator 162, 164 into the air gap 110 between the shuttle 120 and the housing adapter 63. The isolators 162, 164 extend circumferentially around the shuttle 120 and are contained in the channel 65 between the shuttle 120 and the housing adapter 63 by seals 103. The air gap 110 includes a first gap portion 110a radially between the protrusion 124 and an axial portion of the housing adapter 63. Second and third gap portions 110b, 110c are radially between the shuttle 120 and the upper and lower transverse portions 63b of the housing adapter 63.

The shuttle 120 contains one or more circuit boards 140 or other electronic components. In this example, the shuttle 120 has five circuit boards 140 in addition to an RF array 180 is on the top 120b of the shuttle 120. Note that some of the circuit boards 140 can be dummy circuit boards that fill unused slots or weighted non-functional boards to provide a desired weight and balance. In this example, the shuttle 120 has a bottom end cap 120a, a top 120b, and one or more intermediate sections 120c that stack together. A fastener 126 (or multiple fasteners 126) can be used to fix the assembly of shuttle sections 120a-120c and circuit boards 140. In one example, one or more of intermediate sections 120c define protrusion 124 configured as a circumferential flange or rib. A shuttle 120 having multiple stacking sections has an advantage of modular assembly that enables changes in size to accommodate more or fewer circuit boards 140. Additionally, multiple stacking sections can facilitate assembling the shuttle 120 and circuit boards 140 in the housing 52, in some embodiments.

Figure 8:
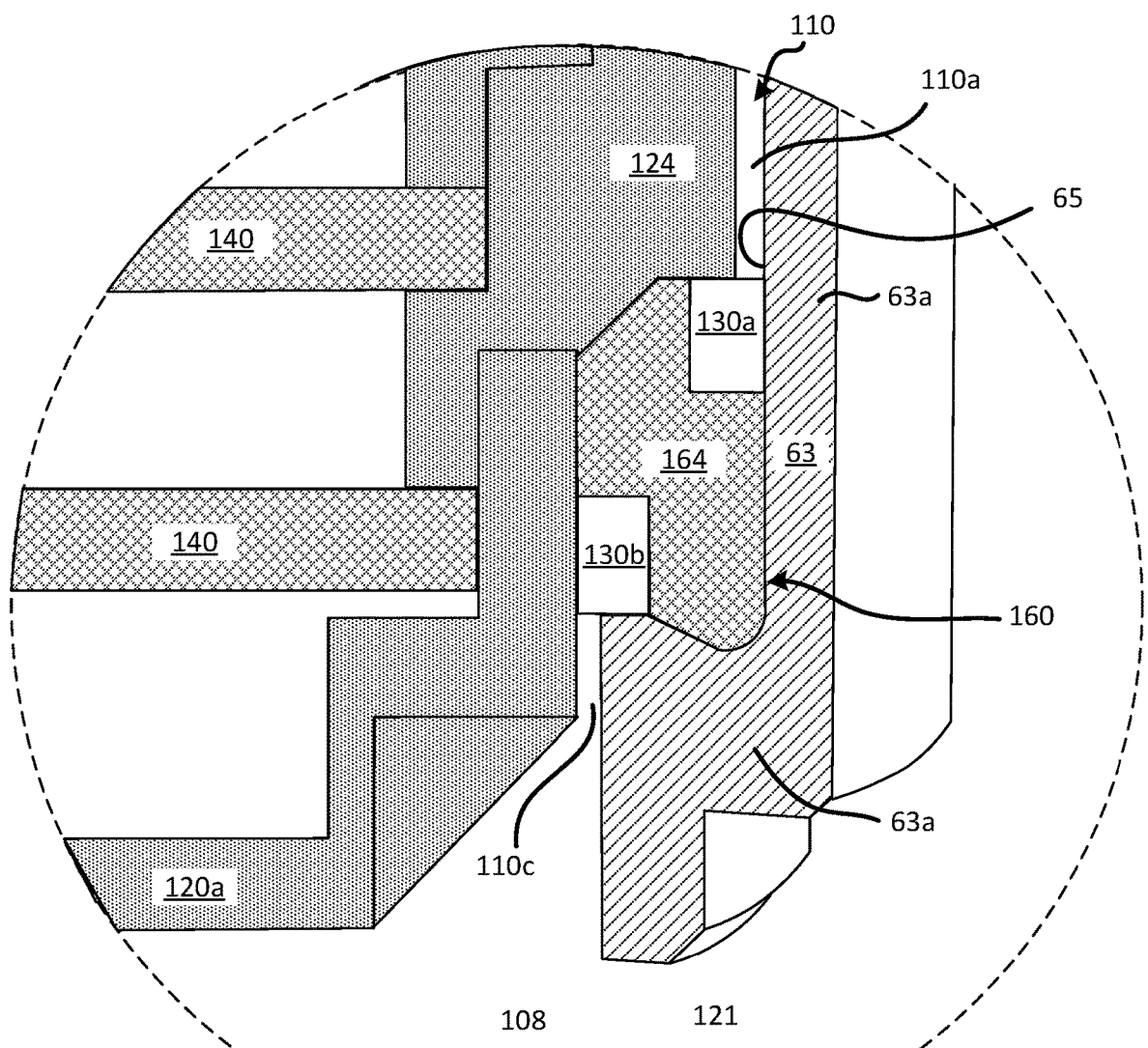
FIG. 8 illustrates a close-up view of the region within the dashed circle of FIG. 7.

As seen in the enlarged view of FIG. 8, for example, the second isolator 164 is contained in the channel 95 axially between the protrusion 124 and the radially extending transverse portion 63b of the housing adapter 63. The second isolator 164 is contained radially between the axial portion 63a of the housing adapter 63 and the shuttle 120. Seals 130 are positioned to close the first gap portion 110a and third gap portion 110c so as to prevent extrusion of the second isolator 164 into gap 110 when it is compressed at launch. During a gun launch, for example, the elastomeric isolator 164 may be compressed to the extent that it becomes a liquid. In this highly compressed condition, the seal(s) 130 prevent extrusion of the elastomeric isolator 164 into the air gap 110. The seals 130 can be configured as anti-extrusion rings that extend circumferentially around the shuttle 120 with a first seal 130a abutting the inner radius of the housing adapter 63 and bridging the first gap portion 110a. A second seal 130b abuts the outside of the shuttle 120 and bridges the third gap portion 110c. The seals 130 are made of a material that is rigid relative to the elastomeric isolator 162.

Examples of acceptable material for seals 130 include aluminum and polyetheretherketone (PEEK). Acceptable materials for the elastomeric isolators 162, 164 include fluorocarbon-based elastomers and fluorinated rubbers, materials that are generally referred to as FKM, buna nitrile, neoprene, ethylene propylene (EPDM) silicone, polyurethane, and poytetrafluoroethylene (PTFE). Suitable materials for the elastomeric isolators 162, 164 include elastomers having a Shore A hardness from 50-95, including 60-80, 70-80, and 70-75. In some embodiments, the elastomeric isolators 162, 164 have a bulk modulus from 0.5 to 10 GPa. In some embodiments, each elastomeric isolator 162, 164 has a thermal conductivity of 1.5 W/mK or less, preferably 1.0 W/mK or less, more preferably 0.5 W/mK or less. In one embodiment the elastomeric isolators 162, 164 have a thermal conductivity for 0.2-0.3 W/mK.

In one example embodiment, the housing 52 (including radome adapter 62 and housing adapter 63) is made of Inconel and the shuttle 120 is made of aluminum. Isolator 162 are made of a fluorinated elastomer (FKM) with a shore A hardness of 70-80, and the seals 130 are made of aluminum or PEEK. Numerous variations and embodiments will be apparent in light of the present disclosure.

In use, the housing 52 is rigidly mounted in the nose portion 58 of a munition. Upon launch, the housing 58 transfers all or a substantial portion of the shock load through isolator(s) 162, 164 to preload the shuttle 120. The elastic modulus E is several orders of magnitude below the bulk modulus K for the material of the isolators 162, 164. The shuttle 120 can be configured to have a resonant frequency that is lower by at least an order of magnitude compared to those of the circuit board(s) 140 retained in the shuttle 120. For example, the circuit boards 140 have a natural resonant frequency of about 30 kHz or greater while the shuttle 120 has a natural resonant frequency of about 3 kHz.

Operating under bulk modulus conditions allows for a high-g, multi-axis, heat tolerant suspension system in a confined space. In accordance with some embodiments, the assembly provides a level of shock and thermal isolation in axial translation, lateral translation, and rotation, where the resonant frequency of the assembly is below that of the circuit board(s) 140. In some embodiments, the resonant frequency of the assembly is below that of the circuit boards 140 by at least an order of magnitude. Thermal isolation can be achieved using an air gap 110 between the shuttle 120 and the housing 52, the use of fluorocarbon elastomeric isolators 162, 164 which are tolerant to at least 600° F., a housing 52 having relatively low heat conductivity (e.g., Inconel), a shuttle 120 with relatively high thermal conductivity (e.g., aluminum), and combinations of these features.

Figure 9A:
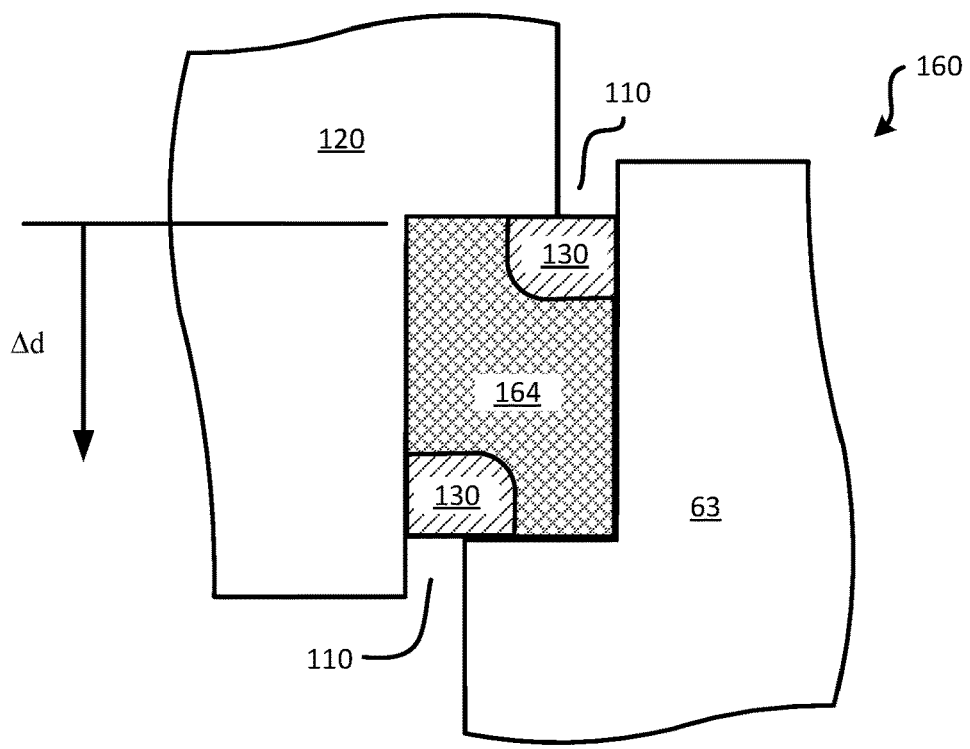
FIGS. 9A and 9B illustrate an isolation assembly and a plot of spring rate for the isolation assembly, respectively, in accordance with an embodiment of the present disclosure.
Figure 9B:
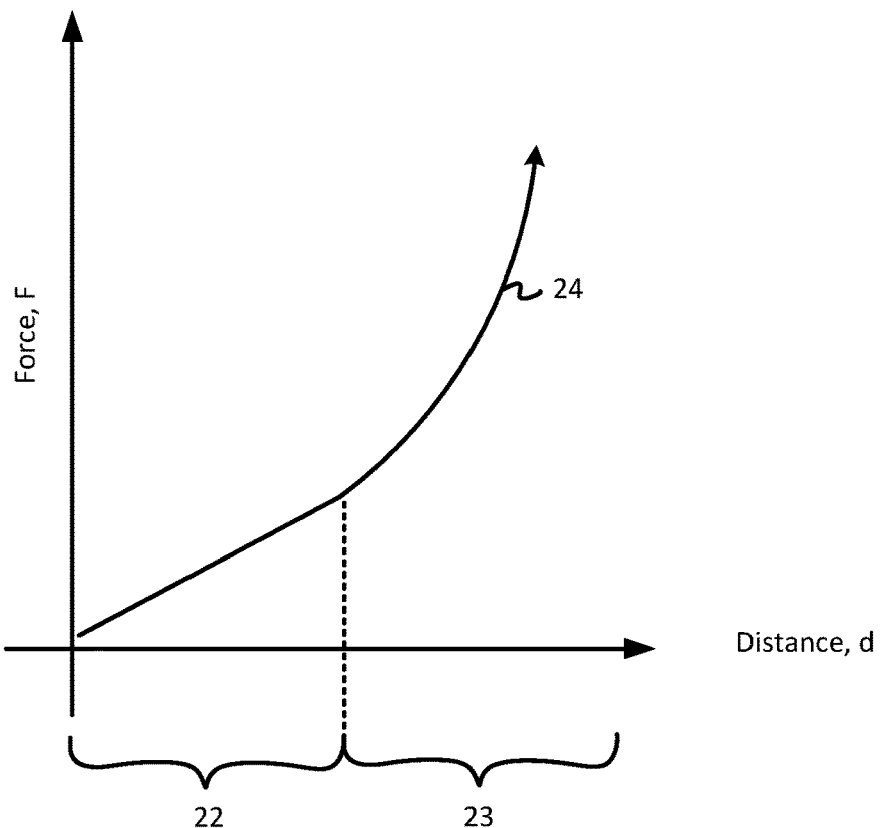

FIG. 9A illustrates an isolation assembly 160 and FIG. 9B illustrates a plot of spring rate 24 as a function of distance and compressive force. An isolation assembly 160 in accordance with the present disclosure is intended to operate once, in contrast to other suspension systems that are designed to operate over multiple cycles. As the shuttle 120 is forced rearward during gun launch, for example, the elastomeric isolator 164 is compressed. Initially, the compression and spring rate 22 are governed by the elastic modulus of the material. Also referred to as Young's modulus, the elastic modulus is the ability of a material to resist change along its length, $\Delta d$. As the density increases with further compression, material voids and/or microspheres collapse. The isolator 164 is now constrained in terms of volume and the compressive behavior is governed by its bulk modulus property. Bulk modulus 24 is a non-linear property, as shown in FIG. 9B. This dual mode compression cycle permanently damages the elastomer, to the point of melt. In doing so, mechanical shock energy is converted to thermal energy. The seals 130 seal the inner and outer diameters of shuttle 120 and housing adaptor 63, maintaining the required boundary conditions for bulk modulus operation, and keeping the elastomer from extruding into unwanted areas of the assembly (e.g., air gap 110). In addition to sealing, the seals 130 configured as anti-extrusion rings provide high levels of coulomb damping, a mechanical damping in which the system's kinetic energy is absorbed via sliding friction. High system damping is desired as it limits the shock application at the shuttle's resonant frequency. Although behavior of the isolator 164 is described in the context of rearward compression, the same suspension principles apply to all degrees of freedom.

Figure 10A:
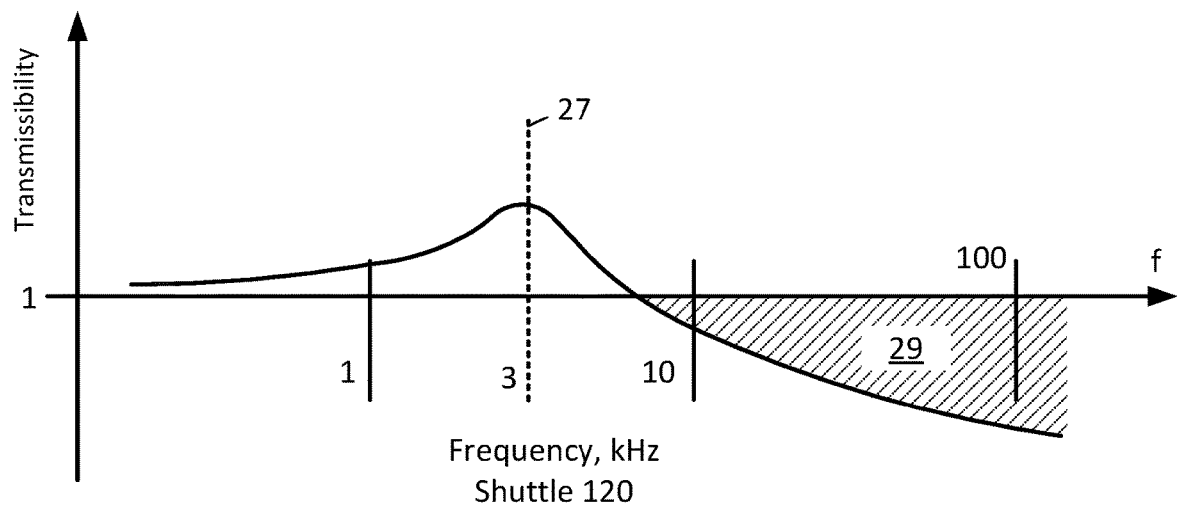
FIGS. 10A and 10B illustrate frequency response plots for a shuttle and for a circuit board retained in the shuttle, respectively, in accordance with an embodiment of the present disclosure.
Figure 10B:
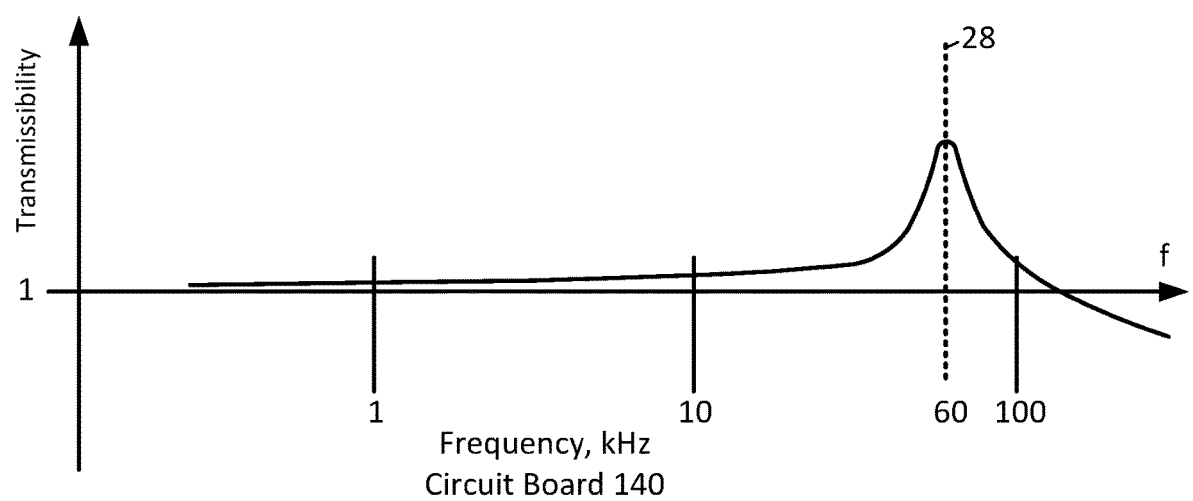

FIG. 10A is a plot of transmissibility vs. frequency for a shuttle 120, in accordance with an embodiment of the present disclosure. FIG. 10B is a plot of transmissibility vs. frequency for a circuit board 140 housed in the shuttle 120, in accordance with an embodiment of the present disclosure. The transmissibility is a ratio of output to input. One key to surviving an impulse is to mitigate motion, such as bending movement of a printed circuit board, which can impart strain to joints and/or the integrated circuit devices. A given structure only vibrates at its resonant, or modal, frequency. A goal of the suspension assembly 160 as variously disclosed herein is to provide the assembly 160 with a resonant frequency 27 at least an order of magnitude below the resonant frequency 28 of the circuit board 140 housed in the shuttle 120. As shown in FIG. 9A, the resonant frequency 27 of the shuttle 120 is about 3 kHz. Above this resonant frequency 27, the transmissibility ratio falls below the horizontal line (i.e., below unity), providing increasing amounts of attenuation. By implementing a high stiffness and low mass design of the support structure of the circuit board(s) 140, the assembly can produce a fundamental circuit board 140 bending mode 28 within the attenuation region 29 of the shuttle 120 (shaded region in FIG. 10A) and therefore can mitigate component failure due to shock-induced strain.

FURTHER EXAMPLE EMBODIMENTS

The following examples pertain to further embodiments, from which numerous permutations and configurations will be apparent.

Example 1 is an isolation assembly for shock and thermal mitigation. The assembly includes a housing of size, shape and material to support integration within a translated vehicle. An absorber assembly is located inside the housing and is adapted to mitigate transmitted shock and thermal loads. The absorber assembly has a shuttle of size, shape, and material to internally support electronic components and externally to provide multi-axis compression. A plurality of disks of viscoelastic material is contained between an inner surface of the housing and an outer surface of the shuttle, the plurality of disks suspending the shuttle and allowing the shuttle to translate with six degrees of freedom via a non-linear spring rate resulting from compression of the viscoelastic material in which a modulus of the viscoelastic material is converted from an elastic modulus to a bulk modulus.

Example 2 includes the isolation assembly of Example 1, wherein the plurality of disks includes a first elastomeric isolator and a second elastomeric isolator axially separated axially by a protrusion extending radially outward from the shuttle.

Example 3 includes the isolation assembly of Example 1 or 2, wherein the viscoelastic material is a fluorinated polymer.

Example 4 is an electronic assembly for a munition, the assembly comprising a housing extending along a central axis and defining a cavity, a shuttle retained within the cavity with a gap between the shuttle and the housing. The shuttle contains one or more electronic component. A plurality of elastomeric isolators in the gap between the shuttle and the housing, the isolators extending circumferentially around the shuttle and retaining the shuttle with six degrees of freedom. One or more seals are provided for individual isolators of the plurality of elastomeric isolators, the one or more seals bridging the gap between the shuttle and the housing.

Example 5 includes the electronic assembly of Example 4, where the housing defines a channel, the plurality of elastomeric isolators is contained in part by the channel.

Example 6 includes the electronic assembly of Example 5, where the housing includes an axial wall portion between first and second radially extending portions to define the channel, and where the one or more seals include a first seal bridging a first gap portion between the first radially extending portion and the housing and a second seal bridging a second gap portion between the second radially extending portion and the housing.

Example 7 includes the electronic assembly of Example 6, wherein the shuttle has a protrusion extending radially outward, the protrusion extending into the channel with a first portion of the gap radially between the protrusion and the axial wall portion of the housing, and a second portion of the gap radially between each of the first and second radially extending portions and the shuttle.

Example 8 includes the electronic assembly of Example 7, where the one or more seals further includes at least one additional seal bridging a third gap portion between the protrusion and the axial wall portion of the housing.

Example 9 includes the electronic assembly of Example 8, wherein the plurality of elastomeric isolators includes a first isolator positioned axially between the protrusion and the first radially extending portion, and positioned radially between the shuttle and the axial wall portion of the housing, and wherein the assembly further includes a second isolator positioned axially between the protrusion and the second radially extending portion and positioned radially between the shuttle and the axial wall portion of the housing, wherein the protrusion is axially between the first isolator and the second isolator.

Example 10 includes the electronic assembly of any one of Examples 4-9, where individual isolators of the plurality of elastomeric isolators have a Shore A hardness from 60-90.

Example 11 is an isolation assembly for a munition, the assembly comprising a housing extending along a central axis and defining a cavity and a shuttle received in the cavity with a gap between the shuttle and the housing, where the shuttle is configured to house one or more electronic components. First and second isolation assemblies are contained in the gap between the shuttle and the housing, the first and second isolation assemblies each including an elastomer and one or more seals, the one or more seals configured and arranged to prevent extrusion of the elastomer, wherein the isolation assembly retains the shuttle in the cavity with six degrees of freedom.

Example 12 includes the isolation assembly of Example 11, wherein the elastomer has a Shore A hardness from 60-90.

Example 13 includes the isolation assembly of Example 11 or 12, wherein the isolator assembly has a thermal conductivity of less than 1.5 W/mK.

Example 14 includes the isolation assembly of any one of Examples 11-14, wherein: the housing includes an axial wall between first and second radially extending wall portions to define a channel extending circumferentially around an inside of the housing; the shuttle has a radial protrusion extending circumferentially around the shuttle, the radial protrusion extending into the channel with a first air gap radially between the protrusion and the axial wall, a second air gap portion radially between the shuttle and the first radially extending wall portion, and a third air gap radially between the shuttle and the second radially extending wall portion; the first isolation assembly is positioned axially between the protrusion and the first radially extending wall portion of the housing and positioned radially between the shuttle and the axial wall portion of the housing; and the second isolation assembly is positioned axially between the protrusion and the second radially extending wall portion of the housing and positioned radially between the shuttle and the axial wall of the housing.

Example 15 includes the isolation assembly of Example 14, where the one or more seals include at least one first seal bridging the first air gap between the protrusion and the axial wall portion, a second seal bridging the second air gap, and a third seal bridging the third air gap.

Example 16 includes the isolation assembly of Example 15, wherein the at least one first seal includes two first seals on opposite axial sides of the protrusion.

Example 17 includes the isolation assembly of any one of Examples 11-16, where the one or more seals are made of polyetheretherketone (PEEK) or aluminum.

Example 18 includes the isolation assembly of any one of Examples 11-17, wherein the elastomer is a fluorinated elastomer.

Example 19 includes the isolation assembly of any one of Examples 11-18 and further comprises one or more circuit boards in the housing, where the housing has a resonant frequency at least one order of magnitude below a resonant frequency of the one or more circuit boards.

Example 20 is a munition comprising the assembly of any one of Examples 1-19.

Example 21 includes the munition of Example 20, where the munition is configured as a gun-launched munition.

Example 22 includes the munition of Example 20, wherein the munition is configured as a tube-launched munition.

Example 23 includes the munition of any of Examples 20-22, where the munition includes a nose portion and the assembly is mounted in the nose portion.

Example 24 includes the munition of any one of Examples 20-23, where the munition has a diameter from 100-200 mm.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. An isolation assembly for shock and thermal mitigation comprising:
    a housing of size, shape and material to support integration within a translated vehicle;
    an absorber assembly located inside the housing and adapted to mitigate transmitted shock and thermal loads, the absorber assembly comprising:
    a shuttle of size, shape, and material to internally support electronic components and externally to provide multi-axis compression;
    a plurality of disks of viscoelastic material contained between an inner surface of the housing and an outer surface of the shuttle, the plurality of disks suspending the shuttle and allowing the shuttle to translate with six degrees of freedom via a non-linear spring rate resulting from compression of the viscoelastic material in which a modulus of the viscoelastic material is converted from an elastic modulus to a bulk modulus;
    wherein the housing has a resonant frequency at least one order of magnitude below a resonant frequency of the one or more electronic components.

2. The isolation system of claim 1, wherein the plurality of disks includes a first elastomeric isolator and a second elastomeric isolator axially separated axially by a protrusion extending radially outward from the shuttle.

3. The isolation assembly of claim 1, wherein the viscoelastic material is a fluorinated polymer.

4. An electronic assembly for a munition, the assembly comprising:
    a housing extending along a central axis and defining a cavity;
    a shuttle retained within the cavity with a gap between the shuttle and the housing;
    one or more electronic components in the shuttle;
    a plurality of elastomeric isolators in the gap between the shuttle and the housing, the plurality of elastomeric isolators extending circumferentially around the shuttle and retaining the shuttle with six degrees of freedom; and
    one or more seals for individual isolators of the plurality of elastomeric isolators, the one or more seals bridging the gap between the shuttle and the housing;
    wherein the housing has a resonant frequency at least one order of magnitude below a resonant frequency of the one or more electronic components in the shuttle.

5. The electronic assembly of claim 4, wherein the housing defines a channel, the plurality of elastomeric isolators is contained in part by the channel.

6. The assembly of claim 5, wherein the housing includes an axial wall portion between first and second radially extending portions to define the channel, and wherein the one or more seals include a first seal bridging a first gap portion between the first radially extending portion and the housing and a second seal bridging a second gap portion between the second radially extending portion and the housing.

7. The assembly of claim 6, wherein the shuttle has a protrusion extending radially outward, the protrusion extending into the channel with a first portion of the gap radially between the protrusion and the axial wall portion of the housing, and a second portion of the gap radially between each of the first and second radially extending portions and the shuttle.

8. The electronic assembly of claim 7, wherein the one or more seals further includes at least one additional seal bridging a third gap portion between the protrusion and the axial wall portion of the housing.

9. The assembly of claim 8, wherein the plurality of elastomeric isolators includes a first isolator positioned axially between the protrusion and the first radially extending portion, and positioned radially between the shuttle and the axial wall portion of the housing, and wherein the assembly further includes a second isolator positioned axially between the protrusion and the second radially extending portion and positioned radially between the shuttle and the axial wall portion of the housing, wherein the protrusion is axially between the first isolator and the second isolator.

10. The assembly of claim 4, wherein individual isolators of the plurality of elastomeric isolators have a Shore A hardness from 60-90.

11. An isolation assembly for a munition, the assembly comprising:
    a housing extending along a central axis and defining a cavity;
    a shuttle received in the cavity with a gap between the shuttle and the housing, the shuttle configured to house one or more electronic components;
    first and second isolation assemblies contained in the gap between the shuttle and the housing, the first and second isolation assemblies each including an elastomer and one or more seals, the one or more seals configured and arranged to prevent extrusion of each of the elastomers, wherein the isolation assembly retains the shuttle in the cavity with six degrees of freedom; and
    one or more circuit boards in the housing, wherein the housing has a resonant frequency at least one order of magnitude below a resonant frequency of the one or more circuit boards.

12. The assembly of claim 11, wherein the elastomer has a Shore A hardness from 60-90.

13. The assembly of claim 12, wherein the isolator assembly has a thermal conductivity of less than 1.5 W/mK.

14. The assembly of claim 11, wherein:
    the housing includes an axial wall between first and second radially extending wall portions to define a channel extending circumferentially around an inside of the housing;
    the shuttle has a radial protrusion extending circumferentially around the shuttle, the radial protrusion extending into the channel with a first air gap radially between the protrusion and the axial wall, a second air gap portion radially between the shuttle and the first radially extending wall portion, and a third air gap radially between the shuttle and the second radially extending wall portion;
    the first isolation assembly is positioned axially between the protrusion and the first radially extending wall portion of the housing and positioned radially between the shuttle and the axial wall portion of the housing; and
    the second isolation assembly is positioned axially between the protrusion and the second radially extending wall portion of the housing and positioned radially between the shuttle and the axial wall of the housing.

15. The assembly of claim 14, wherein the one or more seals include at least one first seal bridging the first air gap between the protrusion and the axial wall portion, a second seal bridging the second air gap, and a third seal bridging the third air gap.

16. The assembly of claim 15, wherein the at least one first seal includes two first seals on opposite axial sides of the protrusion.

17. The assembly of claim 11, wherein the one or more seals are made of polyetheretherketone (PEEK) or aluminum.

18. The assembly of claim 11, wherein the elastomer is a fluorinated elastomer.

19. A munition comprising the assembly of claim 11.

* * * * *